(12) United States Patent
Mori et al.

(10) Patent No.: US 7,358,864 B2
(45) Date of Patent: Apr. 15, 2008

(54) PARKING ASSIST CONTROL APPARATUS

(75) Inventors: Yukio Mori, Kariya (JP); Kazutaka Kato, Kariya (JP); Kazuhiro Kamiya, Kariya (JP); Masahiro Matsuura, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 144 days.

(21) Appl. No.: 11/137,437

(22) Filed: May 26, 2005

(65) Prior Publication Data
US 2005/0270177 A1 Dec. 8, 2005

(30) Foreign Application Priority Data
Jun. 2, 2004 (JP) ............................ 2004-164804

(51) Int. Cl.
*B60Q 1/48* (2006.01)
(52) U.S. Cl. ............................ 340/932.2; 340/426.28; 340/436; 340/441; 180/275; 180/286; 303/125; 303/138; 701/70; 701/301
(58) Field of Classification Search ............ 340/932.2, 340/438, 426.28, 439, 441, 436; 701/208, 701/211, 70, 301; 180/286, 287, 167, 271, 180/275; 303/121, 125, 138
See application file for complete search history.

(56) References Cited

U.S. PATENT DOCUMENTS

| 4,546,845 | A | * | 10/1985 | Meyer et al. | ............... | 180/286 |
| 5,086,868 | A | * | 2/1992 | Fontaine et al. | ........... | 180/287 |
| 5,912,615 | A | * | 6/1999 | Kretzmar et al. | ...... | 340/426.12 |
| 6,450,587 | B1 | * | 9/2002 | MacGregor et al. | .......... | 303/89 |
| 6,654,670 | B2 | | 11/2003 | Kakinami et al. | | |

* cited by examiner

*Primary Examiner*—Davetta W. Goins
(74) *Attorney, Agent, or Firm*—Posz Law Group, PLC (57) ABSTRACT

In a parking assist control apparatus for assisting a driver with parking a vehicle, when a brake control ECU detects that a door is open based on a detection signal from a door open/close sensor during parking assist control, the brake control ECU determines whether the open door is a door other than the driver side door. If the open door is a door other than the driver side door, the vehicle is automatically stopped, thus enabling occupant safety to be ensured.

16 Claims, 4 Drawing Sheets

PARKING ASSIST CONTROL APPARATUS

CROSS REFERENCE TO RELATED APPLICATION

This application is based upon and claims the benefit of Japanese Patent Application No. 2004-164804 filed on Jun. 2, 2004, the content of which are incorporated herein by reference.

FIELD OF THE INVENTION

The present invention relates to a parking assist control apparatus which assists with parking a vehicle so as to enable parking to be done easily.

RELATED ART OF THE INVENTION

In recent years, parking assist control apparatuses have been developed which assist with parking a vehicle so as to enable parking to be done easily. For example, there is technology which, when a driver pushes a parking assist switch provided in a vehicle cabin, accordingly automatically moves the vehicle to the parking space and parks the vehicle without the driver having to do anything. There are also technologies, such as that disclosed in Japanese Patent Application Laid-Open No. 2000-280823, which indicates the path of vehicle travel during parking, and technologies which give instructions for operating the steering wheel, for example, such as "turn the steering wheel to the left" as the vehicle moves when parking in a garage and parallel parking.

With the foregoing parking assist control apparatus, it is possible that an occupant sitting in the passenger seat or another seat may open a door and attempt to get out of the vehicle without asking the driver while parking assist control is being executed. In this case, because the vehicle is moving, it is preferable to have the vehicle stop in view of the safety of the occupant that is attempting to get out of the vehicle.

During parking, however, the driver is typically concentrating on parking and therefore may not notice that another occupant is attempting to get out of the vehicle. It is therefore desirable to enable the vehicle to be stopped even if the driver is unaware that an occupant is attempting to get out of the vehicle.

SUMMARY OF THE INVENTION

In view of the foregoing points, the present invention thus provides a parking assist control apparatus that can ensure the safety of an occupant by stopping a vehicle when a door of the vehicle is opened during parking assist control.

According to a first aspect of the present invention, when a door open detection unit detects that at least one of a plurality of doors provided on a vehicle is opened, a vehicle stop request unit outputs an instruction signal to a braking force apply mechanism which applies braking force to wheels provided on the vehicle, and generates braking force.

In this way, when a door is opened during parking assist control, the vehicle is automatically stopped, thus making it possible to ensure occupant safety.

In this case, the vehicle stop request unit may output the instruction signal when the door open detection unit detects that, from among the plurality of doors, a door other than a driver side door next to the driver seat is opened.

By stopping the vehicle when a door is opened only when that open door is a door other than the driver side door, it possible to realize a failsafe control which takes into account an operation by the driver in which, for example, the driver checks to the rear by opening the door while parking.

Also, when the door open detection unit detects the opening angle of the door, the vehicle stop request unit may output the instruction signal when the door open detection unit detects that the door opening angle which is equal to or greater than a predetermined threshold value.

In this way, the vehicle may be stopped only when the door opening angle is equal to or greater than the predetermined threshold value.

Furthermore, a target deceleration detection unit may obtain a target deceleration from data indicative of the vehicle speed, the braking force that the braking force apply mechanism applies to the wheel may be controlled, and the vehicle stop request unit may output an instruction signal such that the target deceleration obtained by the target deceleration detection unit is achieved.

In this way, by setting the target deceleration according to the vehicle speed and stopping the vehicle, the vehicle can be stopped gradually, i.e., not suddenly, thus making it possible to prevent the door from becoming wide open due to inertia. The same effect can also be achieved by having the vehicle stop request unit output an instruction signal so that a deceleration gradient obtained by a deceleration gradient detection unit can be achieved.

A parking assist control system which includes the parking assist control apparatus according to the first aspect of the present invention can be provided, and the same effects as those described above can be achieved with this parking assist control system.

In the foregoing description, the present invention is described in the form of a parking assist control apparatus. The present invention is not necessarily limited to being applied to only this kind of form, however. For example, the present invention can also be applied to the form of a parking assist control program, or construed in another form such as a parking assist control method or the like.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

First Embodiment

A parking assist control apparatus mounted in a vehicle to which a first embodiment of the present invention is applied will now be described with reference to the appended drawings.

Figure 1:
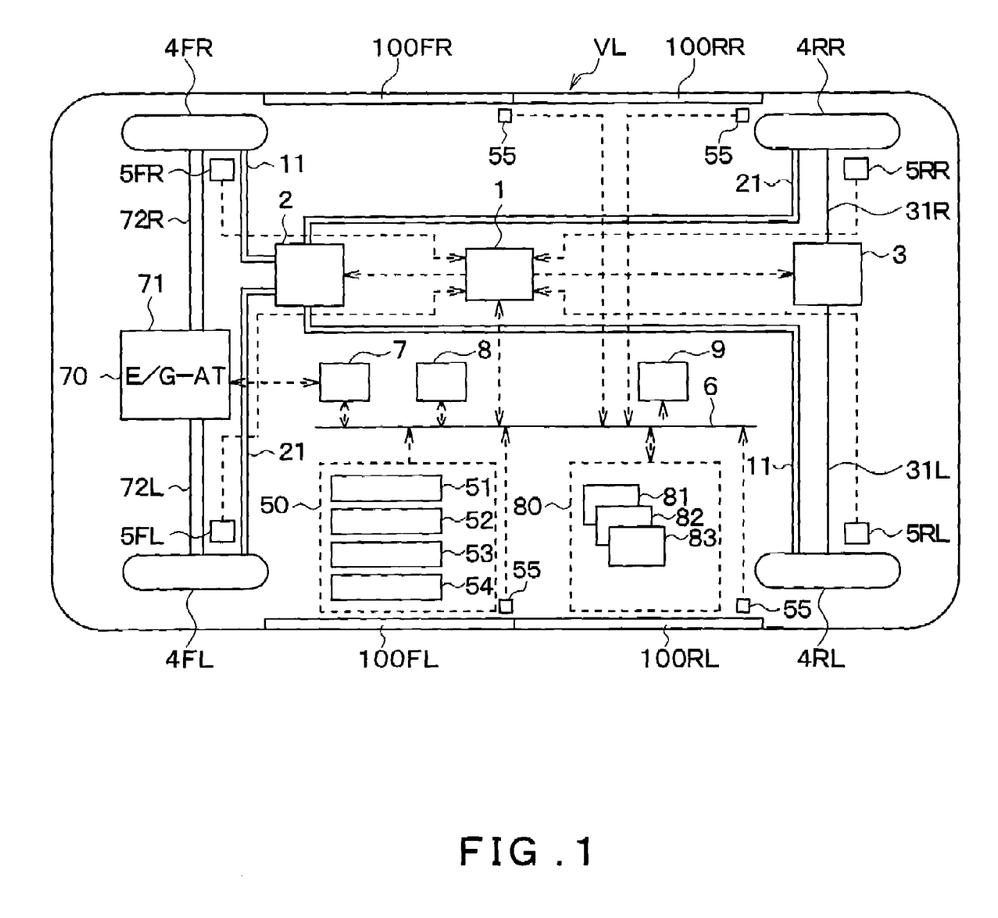
FIG. 1 is a block diagram of a parking assist control apparatus according to a first embodiment of the present invention.

FIG. 1 is an overall diagram of the parking assist control apparatus according to the present embodiment. In the drawing, the structural elements corresponding to a right front wheel, a left front wheel, a right rear wheel, and a left rear wheel of a vehicle VL are denoted by FR, FL, RR, and RL, respectively.

The parking assist control apparatus according to the present embodiment includes a brake control ECU 1, a hydraulic brake unit 2, an electromechanical parking brake (hereinafter simply referred to as "PKB") 3, wheel cylinders (hereinafter simply referred to as "W/C") 41FR, 41RL, 41FL, and 41RR, which are respectively provided on a corresponding wheels 4FR, 4RL, 4FL, and 4RR, wheel speed sensors 5FR, 5RL, 5FL, and 5RR, an in-vehicle LAN bus 6, an engine ECU 7, a peripheral monitoring control ECU 8, a warning indication and alarm device 9, various sensors 50, and a brake request portion 80.

Of these structural elements, the brake control ECU 1, the engine control ECU 7, the peripheral monitoring control ECU 8, the warning indication and alarm device 9, the various sensors 50, and the brake request portion 80 are each connected to the in-vehicle LAN bus 6, through which they transmit and receive signals to and from each other.

The brake control ECU 1 is a computer which both inputs the brake request from the brake request portion 80 and the peripheral monitoring control ECU 8, and sensor signals from the wheel speed sensors 5FR, 5RL, 5FL, and 5RR, and the various sensors 50 via the in-vehicle LAN bus 6, as well as outputs control signals to the engine control ECU 7 and driving signals for controlling the PKB 3 and the hydraulic brake unit 2, to be described later, via the in-vehicle LAN bus 6.

Figure 2:
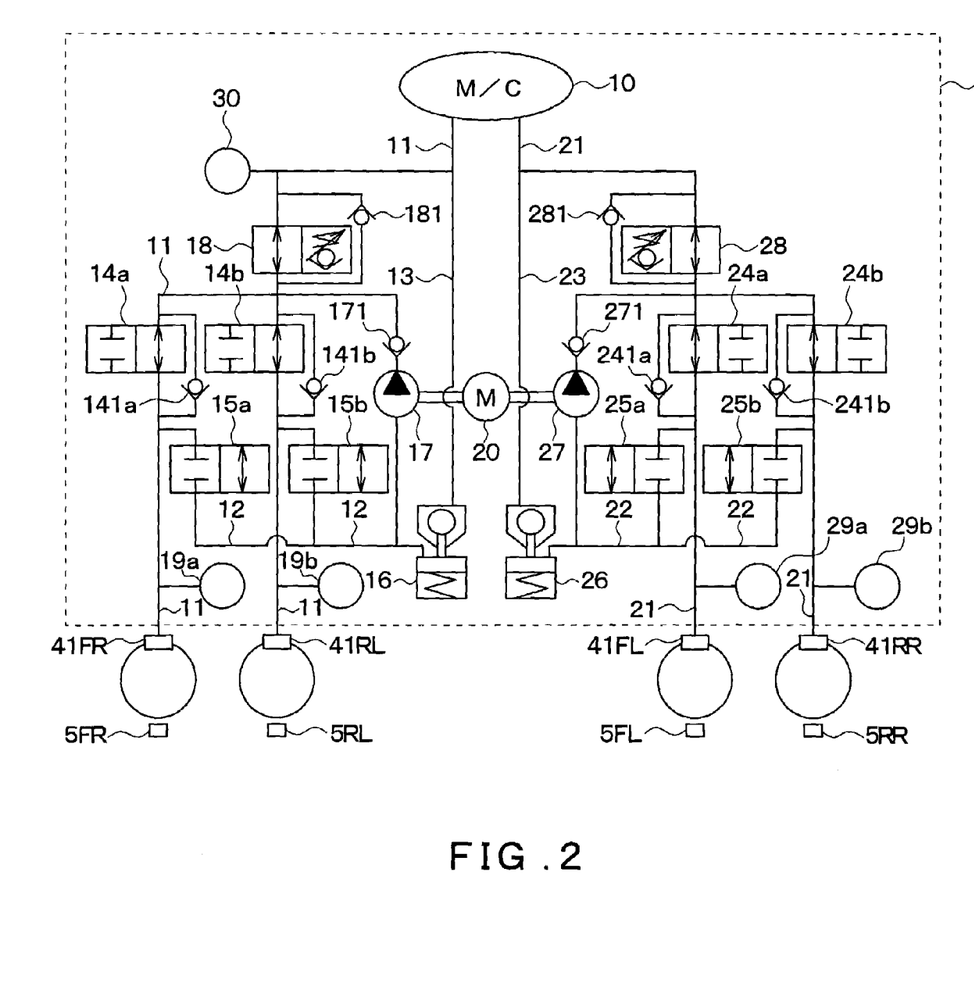
FIG. 2 is a view illustrating a hydraulic brake configuration provided in the parking assist control apparatus.

FIG. 2 is a diagram illustrating the specific configuration of the brake conduits of the hydraulic brake unit 2. The hydraulic brake unit 2 will now be described with reference to this drawing.

When a driver depresses a brake pedal, not shown, a master cylinder (hereinafter simply referred to as "M/C") 10 generates a M/C pressure according to the depression force of the brake pedal detected by a brake operation value sensor 53, to be described later, which is one of the various sensors 50. A first brake system 11 and a second brake system 21 are connected to the M/C 10. The brake systems 11 and 21 are set up so that they are diagonally connected to the W/C 41FR, the 41RL, the 41FL, and the 41RR, i.e., the first brake system 11 is connected to the W/C 41FR and 41RL, while the second brake system 21 is connected to the W/C 41FL and 41RR.

Brake fluid pressure generated by the M/C 10 is transmitted to the W/C 41FR and 41RL provided on the corresponding wheels via the first brake system 11, as well as to the W/C 41FL and 41RR provided on the corresponding wheels via the second brake system 21, such that a first braking force is generated.

The following description focuses on the first brake system 11, more particularly, the brake system related to the right front wheel 4FR. The other wheels and the second brake system 21 are similar.

Pressure increase control valves 14a and 14b are provided in the first brake system 11 for increasing and maintaining the pressure in the W/C 41FR and 41RL during ABS control of the right front wheel 4FR and the left rear wheel 4RL, respectively. Check valves 141a and 141b are provided in parallel with the pressure increase control valves 14a and 14b, respectively, such that if the W/C pressure becomes excessive when the pressure increase control valves 14a and 14b are closed, the hydraulic fluid can escape to the M/C 10 side.

Pressure decrease control valves 15a and 15b for decreasing and maintaining the pressure in the W/C 41FR and 41RL during ABS control are provided in a pressure decrease line 12 which extends from between the pressure increase control valves 14a and 14b and the W/C 41FR and 41RL. This pressure decrease line 12 is connected to a reservoir 16.

Brake fluid stored in the reservoir 16 is sucked up by a pump 17 driven by a motor 20, after which it is discharged between the pressure increase control valves 14a and 14b and a master cutoff valve (hereinafter simply referred to as "SM valve") 18, which will be described later. A check valve 171 is provided at a discharge port of the pump 17 to prevent high brake fluid pressure from being applied to the discharge port of the pump 17.

The SM valve 18 is installed between the M/C 10 and the pressure increase control valves 14a and 14b. This SM valve 18 is a two-position valve which is opened when de-energized and closed by a check valve in the direction shown in the drawing when energized. When in a closed state, the SM valve 18 releases when the pressure on the W/C 41FR and 41RL side becomes greater than the pressure on the M/C 10 side by a cracking pressure of a spring of the check valve, so that pressure can escape. A check valve 181 is provided in parallel with the SM valve 18, which only allows fluid to flow from the M/C 10 side to the W/C 41FR and 41RL side.

The reservoir 16 is connected between the M/C 10 and the SM valve 18 by a suction line 13.

A hydraulic pressure sensor 30 is provided between the M/C 10 and the SM valve 18 in the first brake system 11 so that the brake fluid pressure generated by the M/C 10 can be detected. The brake fluid pressure detected by this hydraulic pressure sensor 30 is a pressure generated in a secondary chamber, not shown, of the M/C 10, but since the same pressure is also generated in a primary chamber to which the second brake system is connected, the hydraulic pressure sensor 30 is effectively able to detect the M/C pressure.

Also, hydraulic pressure sensors 19a and 19b are provided between the pressure increase control valves 14a and 14b and the W/C 41FR and 41RL so that the respective W/C pressures can be detected.

Output signals from the hydraulic pressure sensor 30 and the hydraulic pressure sensors 19a and 19b are input to the brake control ECU 1.

The pressure increase control valves 14a and 14b and the pressure decrease control valves 15a and 15b are all two-position valves. When the valves are de-energized (i.e., OFF), such as when the brake pedal is not being operated and during normal braking, the positions of the valve bodies are as shown in the drawing, i.e., the pressure increase control valves 14a and 14b are opened and the pressure decrease control valves 15a and 15b are closed. Also, when de-energized, as is the case during normal operation, the position of the valve body of the SM valve 18 is as shown in the drawing, i.e., the valve is open.

These control valves are all driven in response to operating signals from the brake control ECU 1. Also, the motor 20 that drives the pumps 17 and 27 is also driven in response to operating signals from the brake control ECU 1.

These operating signals to the hydraulic brake unit 2 as a whole correspond to a first drive signal. Also, stopping control (i.e., prohibiting control) of the hydraulic brake unit 2 means setting the first drive signal to zero (i.e., a de-energized state). More specifically, stopping control of the hydraulic brake unit 2 means de-energizing all of the pressure increase control valves 14a, 14b, 24a, and 24b, the pressure decrease control valves 15a, 15b, 25a, and 25b, and the SM valves 18 and 28, and setting the drive current of the motor 20 to zero. Accordingly, in the hydraulic brake unit 2, when the first drive signal is cancelled, the braking force is also cancelled (i.e., the braking force becomes zero).

Continuing on, the basic control method of this hydraulic brake unit 2 will now be described.

In a normal brake operation when the brake pedal is depressed by the driver, all of the control valves (i.e., the SM valve 18, the pressure increase control valve 14a, and the pressure decrease control valve 15a) are de-energized (i.e., OFF). Therefore, the M/C pressure is simply used for the W/C 41FR and 41RL, such that the W/C pressure equals the M/C pressure.

During ABS control, the operations in the process to decrease the W/C pressure in order to avoid tire lock differ from the operations are performed in the process to increase the W/C pressure in order to recover braking force. During ABS control, the SM valve 18 is normally OFF (i.e., open) and the pump 17 is driven to suck up brake fluid from the reservoir 16.

First, in the pressure decrease process of ABS control, the pressure increase control valve 14a is energized (that is, turned ON), i.e., closed, and ON/OFF duty ratio control is performed on the pressure decrease control valve 15a. Accordingly, the pressure decrease control valve 15a is repeatedly switched between opened state and closed state such that brake fluid flows out from the W/C 41FR to the reservoir 16 at a predetermined change gradient and the W/C pressure decreases.

In the pressure increase process of ABS control, the pressure decrease control valve 15a is de-energized (that is, turned OFF), i.e., closed, and ON/OFF duty ratio control is performed on the pressure increase control valve 14a. Accordingly, the pressure increase control valve 14a is repeatedly switched between opened state and closed state such that brake fluid is supplied from the M/C 10 to the W/C 41FR and the W/C pressure increases.

Next, the pressure increase process and pressure decrease process during a brake operation assigned to the hydraulic brake unit 2 by the brake control ECU 1 based on a brake request signal from the brake request portion 80 and the peripheral monitoring control ECU 8, irrespective of parking assist control, i.e., irrespective of whether the brake pedal is being depressed, will be described.

In the pressure increase process, the SM valve 18 is turned ON (i.e., is closed) and the pressure decrease control valve 15a is turned OFF (i.e., is closed). Also, while generating delivery pressure by driving the pump 17 and sucking up brake fluid from the reservoir 16, the W/C pressure is increased at a predetermined change gradient or until a set target pressure by performing OFF/ON duty ratio control on the pressure increase control valve 14a while performing a comparison with a detection value from the hydraulic pressure sensor 19a. At this time, brake fluid is provided from the M/C 10 to a suction port of the pump 17 via the suction line 13 and the reservoir 16 as necessary.

Also, in the pressure decrease processing, the SM valve 18 is turned ON (i.e., is closed) and the pressure increase control valve 14a is turned ON (i.e., is closed). Further, while generating delivery pressure by driving the pump 17 and sucking up brake fluid from the reservoir 16, the W/C pressure is decreased by sucking brake fluid from the W/C 41FR at a predetermined gradient or until a set target pressure by performing ON/OFF duty ratio control on the pressure decrease control valve 15a while performing a comparison with a detection value from the hydraulic pressure sensor 19a. At this time, the delivery pressure of the pump 17 increases because the pressure increase control valve 14a and the SM valve 18 are both closed. If that pressure becomes greater than the cracking force of the spring of the check valve of the SM valve 18, however, it is released and the pressure drops.

Next, the PKB 3 will be described.

The PKB 3 is connected to brake wires 31R and 31L and brake calipers of the rear wheels 4RL and 4RR. This PKB 3 has an actuator, which is made up of a gear mechanism and a motor, not shown. The actuator operates in response to a second drive signal from the brake control ECU 1 the brake calipers of the left and right rear wheels 4RR and 4RL via the brake wires 31R and 31L. In this manner, the PKB 3 generates braking force, i.e., a second braking force. The motor of the PKB 3 is driven by duty control to run in the normal direction or the reverse direction depending on the second drive signal. Accordingly, the value of the second braking force is able to be controlled.

At this time, a braking force in accordance with the duty ratio is generated and when a target braking force is reached, the motor of the PKB 3 locks. When it is detected that the motor is locked, the drive current to the motor is cut off, i.e., the second drive signal is cancelled, such that control of the PKB 3 is stopped (i.e., prohibited). When control of the PKB 3 is stopped, the gear mechanism does not move so that the second braking force is maintained and a locked state occurs.

In addition to being driven in response to the second drive signal from the brake control ECU 1 during parking assist control, the PKB 3 is also driven by the brake control ECU 1 outputting the second drive signal to the PKB 3 based on an operation signal output when the driver operates a parking brake switch, not shown, ON/OFF.

The wheel speed sensors 5FL to 5RR are provided on corresponding wheels, as shown in FIG. 2, so as to enable the rotation speed of each wheel to be detected. The output signals from the sensors are input directly to the brake control ECU 1. Semiconductor type speed sensors using a hall element, for example, are used for the wheel speed sensors 5FR, 5FL, 5RR, and 5RL so that a reliable wheel rotation pulse can be obtained even at low speeds, which enables an accurate vehicle speed to be detected even at parking speeds.

The engine control ECU 7 controls the engine output by adjusting the fuel injection value according to the running state based on an accelerator aperture signal indicative of an accelerator operating value from an accelerator operating value sensor 52, the engine speed, the coolant temperature, and the oxygen concentration in the exhaust gas, and the like, and then assigning a request value to an engine 70. Accordingly, the driving force of the left and right front wheels 4FR and 4FL, which are rotatably driven via an automatic transmission (AT) 71 and wheel axles 72R and 72L, is adjusted.

The AT 71 is a well-known apparatus which houses a torque converter that transmits rotation of the engine 70 to the wheel axles 72R and 72L, and is controlled to shift by a control apparatus, not shown. In the present embodiment, the AT 71 performs parking assist control actively using the state in which the vehicle travels at a low speed from the creep effect (hereinafter simply referred to as "creep running"). With regard to the control of the AT 71, a description of the control apparatus of the AT 71 will be omitted because it does not particularly relate to the present invention.

That is, in the present embodiment, the engine control ECU 7 runs the vehicle VL in a constant speed mode, combining control of the driving force by either increasing the engine output from an idling state or decreasing the output to the idling state, with control of the braking force by the brake control ECU 1, in response to an engine output adjusting signal from the brake control ECU 1.

The peripheral monitoring control ECU 8 corresponds to a peripheral monitoring unit, which calculates a braking distance L, which is the distance to a location where the vehicle VL should stop, based on a distance x to an obstacle measured by an obstacle sensor 54, to be described later, which is one of the various sensors 50. The peripheral monitoring control ECU 8 then outputs the obtained braking distance L to the brake control ECU 1 as a brake request value.

The warning indication and alarm device 9 includes a warning indicator such as a lamp or a display and an alarm unit such as a buzzer or a speaker. The warning indication and alarm device 9 informs the driver that, for example, various controls are being executed by illuminating the lamp, indicating in the display, or sounding an alarm using the buzzer or the speaker.

The various sensors 50 include a steering angle sensor 51, the accelerator operating value sensor 52, a brake operating value sensor 53, the obstacle sensor 54, and a door open/close sensor 55.

The steering angle sensor 51 detects the steering angle of the steering wheel. The accelerator operating value 52 detects the operating value of the accelerator pedal. The brake operating value sensor 53 detects the operating value of the brake pedal.

The obstacle sensor 54 detects obstacles near the vehicle VL, measures the distance x to an obstacle in front or in back of the vehicle using, for example, corner sonar mounted on a bumper on the front portion or the rear portion of the vehicle, and transmits a signal derived from that distance x to the brake control ECU 1 and other brake request units via the in-vehicle LAN bus 6. The derived signal of the distance x corresponds to the relative speed with respect to an obstacle such as a vehicle running in front or in back of the vehicle.

The door open/close sensor 55 detects whether doors corresponding to the driver seat and another seat are in an opened state or a closed state, and outputs a detection signal according to the opened or closed state of the doors.

For example, the door open/close sensor 55 includes a reflecting mirror provided on a door side, an infrared emitting portion and an optical receiving portion provided on the vehicle body side. The door open/close sensor 55 detects that the door is closed if infrared light emitted from the infrared emitting portion toward the reflecting mirror is reflected by the reflecting mirror and received by the optical receiving portion. If infrared light is not received, the door open/close sensor 55 detects that the door is opened. The detection signal from this door open/close sensor 55 is then input to the brake control ECU 1.

The brake request portion 80 corresponds to a brake request unit and includes a traffic tracking ECU 81, a vehicle-to-vehicle distance control ECU 82, and a doze prevention ECU 83.

The traffic tracking ECU 81 detects a braking and stopped state of a preceding vehicle when there is traffic congestion, and calculates, based on the vehicle speed of the host vehicle VL, a target deceleration (for example, a deceleration of 0.23 G (G gravitational acceleration) for maintaining a vehicle-to-vehicle distance or stopping the host vehicle VL at a position a predetermined distance from the preceding vehicle without the host vehicle VL rear-ending the preceding vehicle. The traffic tracking ECU 81 then outputs the calculation results to the brake control ECU via the in-vehicle LAN bus 6 as an ECU request value.

In the brake control ECU 1, the deceleration of 1 G corresponds to a brake pressure of 10 MPa (Pa: unit of pressure, Pascal). The deceleration indicated by the ECU request value is then converted to a brake pressure (i.e., brake hydraulic pressure), the value of which is then evaluated.

The vehicle-to-vehicle distance control ECU 82 detects the distance and the relative speed between the host vehicle VL and an obstacle such as a vehicle in front or in back of the vehicle. The vehicle-to-vehicle distance control ECU 82 performs drive control by the engine control ECU 7 and brake control by the brake control ECU 1 so as to maintain the vehicle-to-vehicle distance to the obstacle at a predetermined value that has been either set in advance or reset by the driver. Further, the vehicle-to-vehicle distance control ECU 82 outputs a target braking distance (for example, stopping in 28 m) to the brake control ECU 1 as an ECU request value. Also, because of the possibility of a pedestrian or the like suddenly running out in the direction in which the vehicle is traveling, a brake request is output which enables sudden braking when the distance between the vehicle and the obstacle in front or in back of the vehicle decreases suddenly. The distance to the obstacle in front or in back of the vehicle is detected by the obstacle sensor 54.

Accordingly, in the brake control ECU 1, a target deceleration is obtained from the current vehicle speed and the target braking distance or a maximum deceleration for sudden braking is set. That target deceleration or maximum deceleration is then converted to a brake pressure, just as described above, the value of which is then evaluated.

The doze prevention ECU 83 determines whether the driver is dozing off by detecting the driving operation state or the physiological state of the driver, and issues an alarm such as a buzzer to prompt the driver awake and performs instant braking off and on. In the present embodiment, the doze prevention ECU 83 assigns a value which changes over time for the target braking fluid pressure to the brake control ECU 1 as an ECU request value in order to awaken the driver. The change over time in the braking force can have a triangular wave shape, for example.

The parking assist control apparatus according to the present embodiment is structured as described above. With a parking assist control apparatus of this kind of structure, a parking assist control is executed when a switch, not shown, for starting the parking assist control is pushed and the parking assist mode is set. More specifically, the various controls such as the parking assist control and the failsafe control are executed by the brake control ECU 1, the engine control ECU 7, and the peripheral monitoring ECU 8 based on the detection signals from the wheel speed sensors 5FL to 5RR, the W/C pressure sensors 19a, 19b, 29a and 29b, and the various sensors 50, as well as the target deceleration output as the ECU request value from the brake request portion 80, and the like.

Then, when the distance x between the vehicle VL and the obstacle is relatively large when the parking assist control is executed, the vehicle VL is adjusted so that it creeps at a target speed (i.e., a creep speed) according to the brake operating value and the road gradient by operating in the constant speed mode. When the distance x to the obstacle becomes smaller, a switch is made to operation in a stop-vehicle mode and the vehicle VL is adjusted to decelerate by generating a braking force so that the braking distance set according to the vehicle speed is achieved.

Continuing on, the failsafe control executed during this parking assist control will now be described.

This failsafe control routine stops the vehicle VL from moving when the door open/close sensor 55 detects that a door is opened while parking assist control is being executed, because it is dangerous to have the vehicle VL continue moving without the driver being aware of the door being opened.

Figure 3:
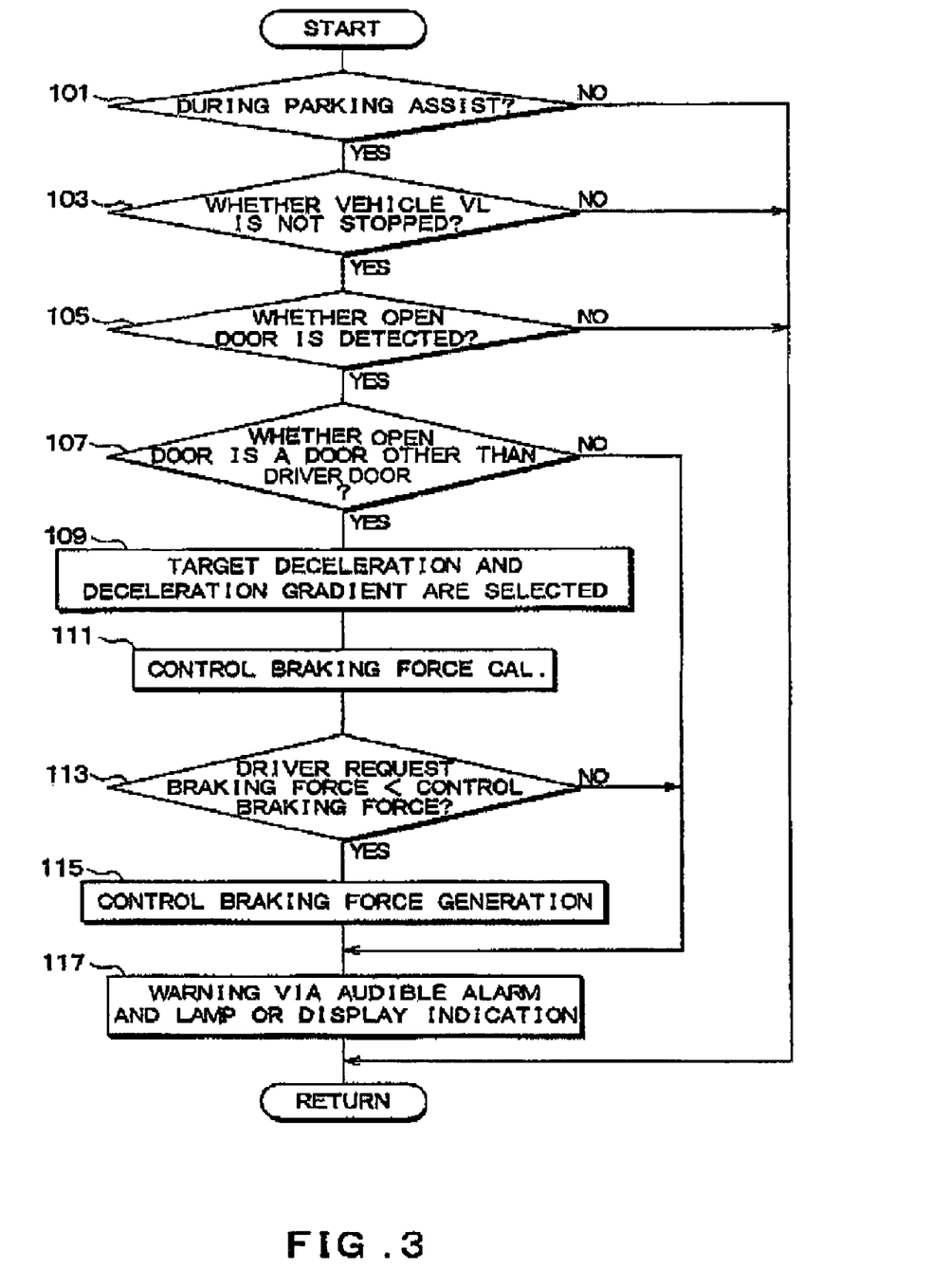
FIG. 3 is a flowchart showing the details of a failsafe control routine executed by a brake control ECU.

FIG. 3 is a flowchart of a failsafe control routine. The failsafe control routine illustrated in this flowchart is executed by the brake control ECU 1 at predetermined control cycles when the switch, not shown, for starting the parking assist control in the vehicle is on.

First, at 101, it is determined whether parking assist control is currently being executed. For example, when the parking assist control is being executed, a flag in memory, not shown, provided in the brake control ECU 1 is set. The determination can be made by confirming whether that flag is set or reset.

When the determination at 101 is NO, it means that the parking assist control is not currently being executed so that the routine directly ends. When the determination at 101 is YES, it means that the parking assist control is currently being executed so that the routine proceeds to the processing at 103.

At 103, it is determined whether the vehicle VL is not stopped, i.e., whether the vehicle is moving. While the vehicle VL is stopped, an open door causes no problem. Therefore, when the determination at 103 is NO, the routine directly ends. When the determination at 103 is YES, the routine proceeds to the processing at 105.

At 105, it is determined whether an open door is detected. This determination is made based on the detection signal from the door open/close sensor 55. Then, if no open door is detected, the routine directly ends. If an open door is detected, the routine proceeds to the processing at 107.

At 107, it is determined whether a detected open door is a door other than the driver door. That is, it is determined whether the detection signal indicating that a door is opened was output from the door open/close sensor 55 mounted at a seat other than the driver seat. Taking into account the fact that some drivers open the driver door while parking in order to visually check behind the vehicle, the routine directly ends if the determination at 107 is NO, and proceeds to the processing at 109 if the determination is YES.

At 109, the target deceleration and the deceleration gradient are selected according to the current vehicle speed. For the current vehicle speed, for example, a vehicle speed obtained during parking assist control based on signals from the wheel speed sensors 5FL to 5RR can be used, or a vehicle speed obtained previously by another ECU can be used. The deceleration gradient is selected using a deceleration gradient map according to the vehicle speed set beforehand in the brake control ECU 1.

Continuing on, the routine proceeds to the processing at 111, where the control braking force for obtaining the selected deceleration gradient is calculated. The calculation of the brake pressure for the deceleration is the same as is described above.

Continuously, the routine proceeds to the processing at 113, where it is determined whether the control braking force is large with respect to the braking force required by the driver (hereinafter simply referred to as "driver request braking force"). The driver request braking force in this case means the braking force generated in accordance with depression of the brake pedal by the driver. If the control braking force is greater than this driver request braking force, it means that a braking force greater than that required by the driver is necessary so that the routine proceeds to the processing at 115 in order to generate the control braking force. If, on the other hand, the driver request braking force is greater than the control braking force, it means that the braking force required by the driver is greater than the braking force required by the failsafe control, so that the driver's brake request is respected and priority is given to the driver request braking force. In this case, the routine skips the processing at 115 and proceeds to the processing at 117.

At 115, processing is executed to generate the control braking force. More specifically, the valve positions of the control valves are adjusted so that a braking pressure corresponding to the control braking force is generated. For example, the SM valves 18 and 28 are energized and switched closed while the other control valves remain de-energized. The motor 20 is then turned on and the pumps 17 and 27 are driven such that brake fluid is sucked in from the M/C 10 side through the reservoirs 16 and 26 and discharged by the pumps 17 and 27. Accordingly, the W/C pressure in each W/C 41FR to 41RR increases, thus generating the control braking force. The routine then proceeds to the processing at 117.

At 117, warning processing is executed. In this processing, a control signal indicating that a door is opened and failsafe control was executed is output to the warning indication and alarm device 9 in order to issue an alarm via an audible alarm and a lamp or display indication. Accordingly, an alarm is issued in the form of lamp illumination or a display indication and an audible alarm via a buzzer or speaker, thus notifying the driver that a door has been opened.

As described above, with the parking assist control apparatus according to the present embodiment, the vehicle VL is automatically stopped when a door is opened during parking assist control. Thus, it is possible to ensure the safety of the occupants.

In the past, a brake control apparatus which prevents a vehicle from moving when an occupant is getting into or out of the vehicle has been proposed in Japanese Patent Application Laid-Open No. Hei 9-58430. This brake control apparatus reliably stops the vehicle by increasing the brake pressure when a door of the vehicle is opened while the vehicle is stopped with the brake pressure being maintained by the brake pedal being depressed, but then starts to move despite the fact that the brake pedal is being depressed.

The technology disclosed in the foregoing publication, however, presumes that the brake pedal is being depressed and can not respond to a case in which the brake pedal is not being depressed. In particular, when parking assist control is being executed, the driver may end up relying on that control or the instructions provided by that control, and therefore may not be depressing the brake pedal. In this case, the vehicle would not stop, which is undesirable.

Accordingly, as illustrated by the exemplary embodiment, when a door is opened during parking assist control the vehicle VL is automatically stopped irrespective of whether the brake pedal is being depressed, such that occupant safety is able to be ensured even if the brake pedal is not being depressed.

Further, by having the vehicle VL stop when a door is opened only if that open door is a door other than the driver side door, failsafe control is made possible which takes into account drivers who open the door to visually check behind the vehicle while parking.

Also, with the failsafe control of the present embodiment, a deceleration gradient is selected according to the vehicle speed and the vehicle VL is brought to a stop after being decelerated at a target deceleration that enables the selected deceleration gradient to be achieved. Therefore, the vehicle VL can be stopped without sudden braking, thus making it possible to prevent the door from becoming wide open due to inertia.

However, when the driver request braking force is greater than the control braking force for achieving the selected deceleration gradient, the wish of the driving to brake can also be respected by enabling the driver request braking force to be obtained.

The processing illustrated in FIG. 3 corresponds to the units which execute the various processing.

Other Embodiments (1) In the foregoing exemplary embodiment, no treatments are taken when the driver side door is opened during parking assist control. However, the vehicle VL may also be stopped in this case as well. Also, when only the driver side door is opened, only an alarm may be issued by the audible alarm of a buzzer, for example, and the vehicle VL may be allowed to continue moving by the parking assist control without being stopped.

(2) Also, in the foregoing exemplary embodiment, control is performed so that the vehicle VL stops uniformly when an open door is detected. Alternatively, however, different control may be performed depending on the opened or closed state of the door.

Figure 4:
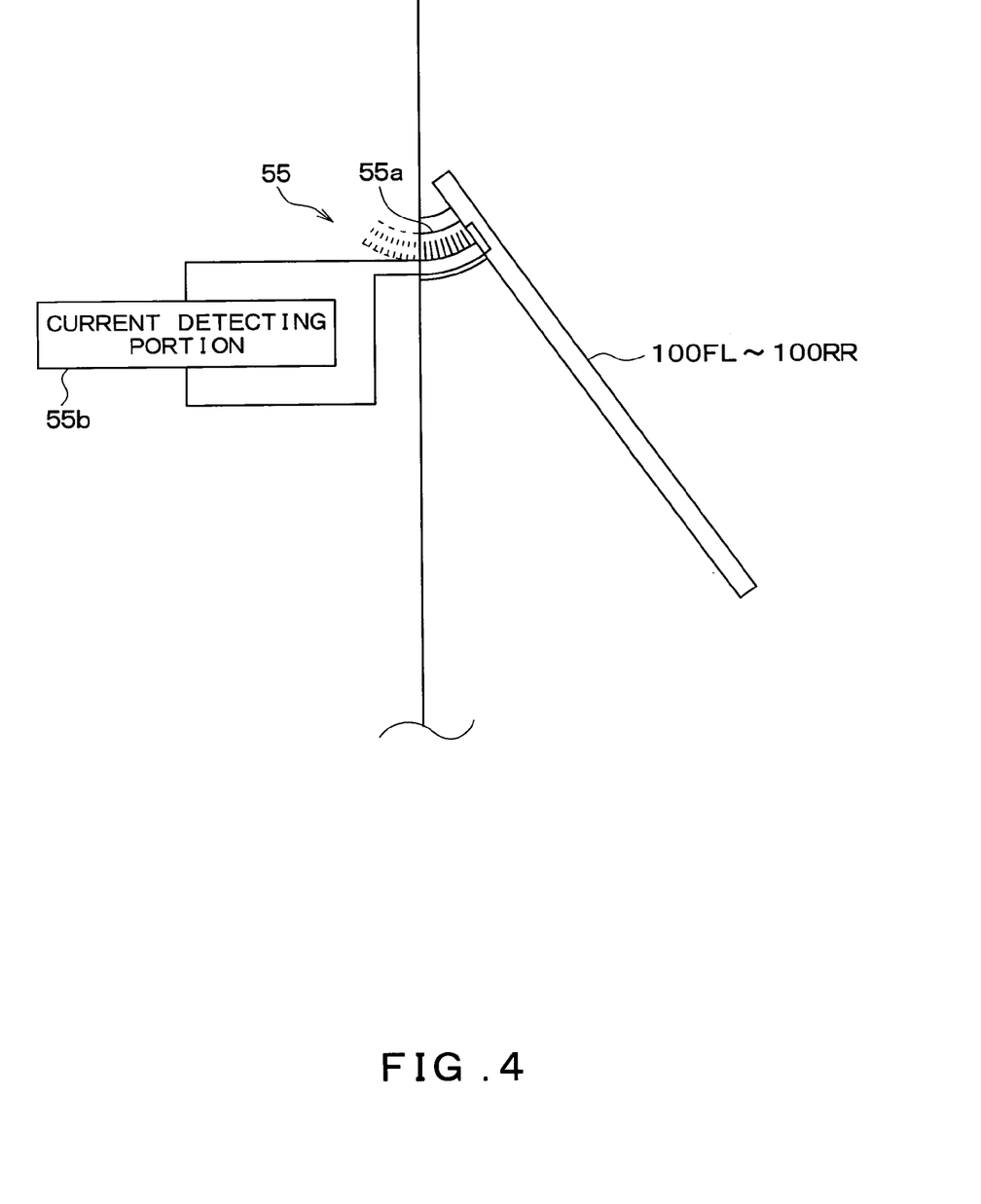
FIG. 4 is a representative view of a base portion of a door.

For example, as shown in the representative view of a base portion of a door in FIG. 4, a resistor 55a is provided on a base portion of a door. The resistance value of this resistor 55a varies depending on the opening angle of the door. In addition, terminals that apply a predetermined voltage to the resistor 55a are provided on the vehicle body side and the door side. The door opening angle can then be detected by reading, with a current detecting portion 55b, a current value that fluctuates in accordance with the resistance value. Structuring the door open/close sensor 55 illustrated in the foregoing exemplary embodiment in this manner enables the door open/close sensor 55 to output a detection signal according to the door opening angle.

Thus, the door opening angle may also be detected from the detection signal of the door open/close sensor 55 and the vehicle VL may also be stopped by the brake control ECU 1, as described above, only when the door opening angle is equal to, or greater than, a predetermined threshold value.

(3) The first embodiment describes a case in which the control braking force is generated by the hydraulic brake unit 2 from among the braking force apply mechanisms. The control braking force may also be generated, however, by the PKB 3 together with the hydraulic brake unit 2, or by the PKB 3 alone. Furthermore, when another structure, such as a regenerative brake, is included as a braking force apply mechanism, the control braking force may also be generated by a combination of this and those described above.

(4) Also, in the first embodiment, the failsafe control routine is executed by the brake control ECU 1, but it does not necessarily have to be the brake control ECU 1. In particular, when there is an integrated ECU or the like that comprehensively performs various controls in a vehicle where research has been advancing in recent years, that integrated ECU may execute the failsafe control routine. Further, the failsafe control routine may also be executed by a plurality of ECUs.

While the above description is of the preferred embodiments of the present invention, it should be appreciated that the invention may be modified, altered, or varied without deviating from the scope and fair meaning of the following claims.

What is claimed is:

1. A parking assist control apparatus which assists a driver with parking a vehicle, comprising:
   a door open detection unit which receives a detection signal indicative of an opened state or a closed state of each of a plurality of doors provided on the vehicle;
   a vehicle stop request unit which stops the vehicle by outputting an instruction signal to a braking force apply mechanism which applies a braking force to wheels provided on the vehicle and which generates braking force when the door open detection unit detects that at least one of the doors is open; and
   a control unit which calculates a target deceleration based on a vehicle speed and a braking distance, which is a distance from a present position to a position at which the vehicle should stop and is determined based on a distance from the vehicle to an obstacle, and which executes deceleration control to control a deceleration of the vehicle to reach the target deceleration, wherein
   the vehicle stop request unit stops the vehicle by outputting the instruction signal to cause the braking force apply mechanism to apply the braking force on the wheels when the door open detection unit detects that a door other than a driver door is open, but does not stop the vehicle even if the driver door is open.

2. The parking assist control apparatus according to claim 1, wherein the door open detection unit is able to detect an opening angle of the door other than the driver door, and the vehicle stop request unit stops the vehicle by outputting the instruction signal to cause the braking farce apply mechanism to generate the braking force on the wheels when the door open detection unit detects that the door other than the driver door is opened with an angle which is equal to or greater than a predetermined threshold value.

3. The parking assist control apparatus according to claim 1, wherein the control unit comprises a target deceleration detection unit which receives data indicative of the vehicle speed and obtains the target deceleration based on the data indicative of the vehicle speed, and
   the vehicle stop request unit controls the braking force applied to the wheels by the braking force apply mechanism, and outputs the instruction signal so that the target deceleration obtained by the target deceleration detection unit is achieved.

4. The parking assist control apparatus according to claim 1, wherein the control unit comprises a deceleration gradient detection unit which receives data indicative of the vehicle speed and obtains a deceleration gradient based on the data indicative of the vehicle speed, wherein
   the vehicle stop request unit controls braking force applied to the wheels by the braking force apply mechanism, and outputs the instruction signal so that the deceleration gradient obtained by the deceleration gradient detection unit is achieved.

5. The parking assist control apparatus according to claim 1, wherein the braking force apply mechanism includes an automatic pressure increase braking force generating device which generates braking force on the wheels by automatically increasing the pressure, and the vehicle stop request unit stops the vehicle by controlling the automatic pressure increase braking force generating device by outputting the instruction signal, and generating braking force on the wheels by automatically increasing the pressure.

6. The parking assist control apparatus according to claim 1, wherein the parking assist control apparatus is executed only when the vehicle is moving.

7. The parking assist control apparatus according to claim 6, wherein a moving direction of the vehicle is backward.

8. A parking assist control apparatus for a vehicle, comprising:
- a braking force apply mechanism for applying a braking force to vehicle wheels;
- a door open detection unit for detecting when a vehicle door is open;
- a control unit which calculates a target deceleration based on a vehicle speed and a braking distance, which is a distance from a present position to a position at which the vehicle should stop and which is determined based on a distance from the vehicle to an obstacle, and which executes deceleration control to control a deceleration of the vehicle to reach the target deceleration; and
- a vehicle stop request unit for stopping the vehicle by instructing the braking force apply mechanism to apply a braking force to the vehicle wheels when the door open detection unit detects that a vehicle door other than a driver door is open, and for not stopping the vehicle when only the driver door is open.

9. The parking assist control apparatus according to claim 8, wherein the door open detection unit is able to detect an opening angle of the door other than the driver door, and the vehicle stop request unit stops the vehicle by outputting the instruction signal to cause the braking force apply mechanism to generate the braking force on the wheels when the door open detection unit detects that the door other than the driver door is opened with an angle which is equal to or greater than a predetermined threshold value.

10. The parking assist control apparatus according to claim 8, wherein the control unit comprises a target deceleration detection unit which receives data indicative of the vehicle speed and obtains the target deceleration based on the data indicative of the vehicle speed, and
the vehicle stop request unit controls the braking force applied to the wheels by the braking force apply mechanism, and outputs the instruction signal so that the target deceleration obtained by the target deceleration detection unit is achieved.

11. The parking assist control apparatus according to claim 8, wherein the control unit comprises a deceleration gradient detection unit which receives data indicative of the vehicle speed and obtains a deceleration gradient based on the data indicative of the vehicle speed, wherein
the vehicle stop request unit controls braking force applied to the wheels by the braking force apply mechanism, and outputs the instruction signal so that the deceleration gradient obtained by the deceleration gradient detection unit is achieved.

12. The parking assist control apparatus according to claim 8, wherein the braking force apply mechanism includes an automatic pressure increase braking force generating device which generates braking force on the wheels by automatically increasing the pressure, and the vehicle stop request unit stops the vehicle by controlling the automatic pressure increase braking force generating device by outputting the instruction signal, and generating braking force on the wheels by automatically increasing the pressure.

13. The parking assist control apparatus according to claim 8, wherein the parking assist control apparatus is executed only when the vehicle is moving.

14. The parking assist control apparatus according to claim 13, wherein a moving direction of the vehicle is backward.

15. A control unit for executing a failsafe control routine during a vehicle parking assist control operation, the control unit programmed to:
- calculate a target deceleration based on a vehicle speed and a braking distance, which is a distance from a present position to a position at which the vehicle should stop and which is determined based on a distance from the vehicle to an obstacle;
- execute deceleration control to control a deceleration of the vehicle to reach the target deceleration; and
- output a signal to cause a wheel braking force upon receiving a signal indicating that a door other than a driver door is open.

16. The control unit according to claim 15, wherein the control unit is further programmed to:
- calculate a target deceleration gradient based on data indicative of the vehicle speed; and
- execute deceleration gradient control to control a deceleration gradient of the vehicle to reach the target deceleration gradient.

* * * * *